T. W. ELLIS.
Foot-Mats.
No. 151,766.　　　　　　　　　　　Patented June 9, 1874.
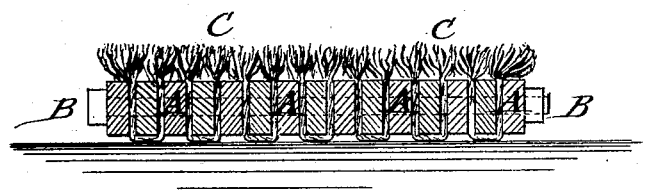
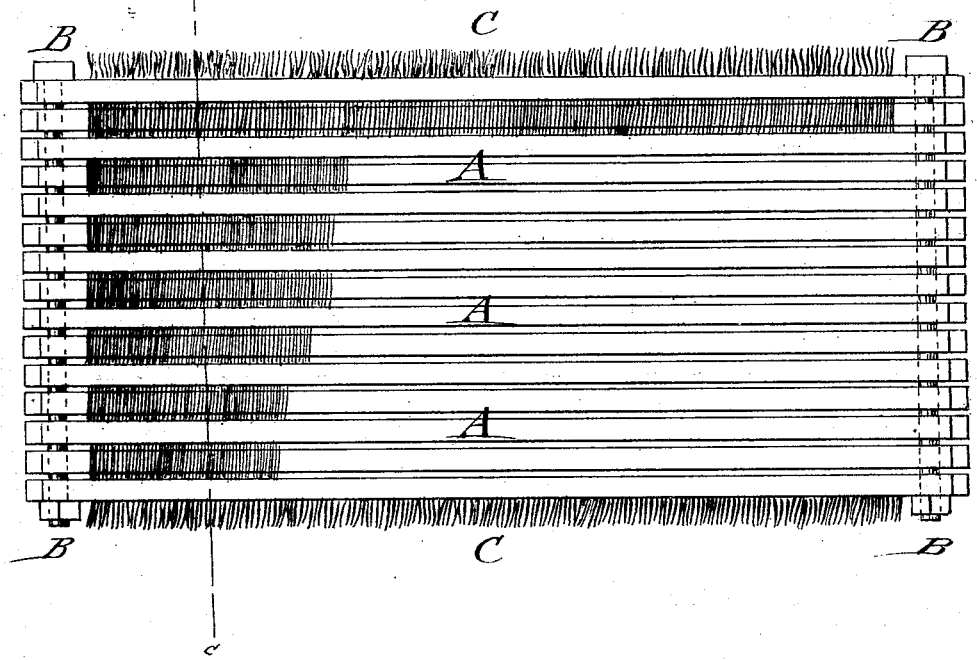
WITNESSES:
Alex T. Roberts
Frank R. Blockley
INVENTOR:
T. W. Ellis
BY Munn
ATTORNEYS.

UNITED STATES PATENT OFFICE.

THEODORE W. ELLIS, OF MACON, GEORGIA.

IMPROVEMENT IN FOOT-MATS.

Specification forming part of Letters Patent No. 151,766, dated June 9, 1874; application filed April 18, 1874.

*To all whom it may concern:*

Be it known that I, THEODORE W. ELLIS, of Macon, in the county of Bibb, State of Georgia, have invented a new and useful Improvement in Foot-Mat and Matting; and I do hereby declare that the following is a full, clear, and exact description thereof, which will enable others skilled in the art to make and use the same, reference being had to the accompanying drawings, forming part of this specification.

This invention relates to a new and useful improvement in foot-mats and matting, whereby much strength is gained and economy practiced; and it consists in a number of parallel bars, either of wood or metal, confined by iron bolts or rope, and securing the necessary filling for a mat, as hereinafter more fully described.

In the accompanying drawing, Figure 1 represents a vertical transverse section of the mat on line *c c*, Fig. 2; and Fig. 2, a bottom view of the same.

A A are the parallel bars, of either wood or metal, of any convenient size and shape, arranged so as to be drawn tightly together by cordage or wooden clamps, or any other secure and convenient manner, such as the iron bolts in this example, these parallel bars being provided with holes for the free passage of said bolts, thus holding the filling. B B are the iron bolts, which give the lateral pressure to the bars necessary to confine the filling of the mat. C is the filling used for making the mat, which is placed in and around the parallel bars, and secured in its place by tightening the nuts of the bolts. This filling may be of rope, straw, or any other suitable material, which, when worn out, may be replaced by new filling.

Having thus described my invention, I claim as new and desire to secure by Letters Patent—

The improved door-mat herein described, consisting of the parallel bars A, the filling C, looped around the same, and the transverse clamping-bolts B, passing through the ends of the bars, as and for the purpose set forth.

THEO. W. ELLIS.

Witnesses:
 WILLIS F. PRICE,
 S. B. PRICE.